(12) United States Patent
Kang et al.

(10) Patent No.: US 11,270,259 B1
(45) Date of Patent: Mar. 8, 2022

(54) METHOD FOR PROVIDING INFORMATION RELATED TO ITEM AND ELECTRONIC APPARATUS USING THE SAME

(71) Applicant: Coupang Corp., Seoul (KR)

(72) Inventors: Young Shin Kang, Seoul (KR); Hye Joon Cha, Seoul (KR); Seung Hoon Park, Seoul (KR); Hong Gyem Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/153,284

(22) Filed: Jan. 20, 2021

(30) Foreign Application Priority Data

Dec. 24, 2020 (KR) ........................ 10-2020-0183379

(51) Int. Cl.
*G06Q 10/08* (2012.01)
*G08B 7/06* (2006.01)
*G06Q 50/28* (2012.01)

(52) U.S. Cl.
CPC ......... *G06Q 10/087* (2013.01); *G06Q 10/083* (2013.01); *G06Q 50/28* (2013.01); *G08B 7/06* (2013.01)

(58) Field of Classification Search
CPC .... G06Q 10/087; G06Q 10/083; G06Q 50/28; G08B 7/06
See application file for complete search history.

(56) References Cited

U.S. PATENT DOCUMENTS

| | | | |
|---|---|---|---|
| 6,289,260 B1* | 9/2001 | Bradley | B65G 1/1373 414/273 |
| 2016/0048802 A1* | 2/2016 | Luwang | G06Q 10/08355 705/338 |
| 2018/0215543 A1 | 8/2018 | Lert, Jr. et al. | |
| 2019/0156277 A1* | 5/2019 | Fisher | G06K 9/00375 |
| 2020/0034992 A1* | 1/2020 | Gershon | G06K 9/628 |
| 2020/0057981 A1* | 2/2020 | Partin | G06Q 30/0202 |
| 2020/0356945 A1* | 11/2020 | Durkee | B65G 1/0492 |

FOREIGN PATENT DOCUMENTS

| | | |
|---|---|---|
| JP | 2001-301919 A | 10/2001 |
| JP | 2005-206268 A | 8/2005 |
| JP | 3219972 U | 1/2019 |
| JP | 6677858 B1 | 4/2020 |
| KR | 1020100038957 A | 4/2010 |
| KR | 1020140014524 A | 2/2014 |
| KR | 10-2018-0058194 A | 5/2018 |
| KR | 10-2019-0117554 A | 10/2019 |
| KR | 10-2114363 B1 | 5/2020 |
| KR | 10-2020-0069847 A | 6/2020 |

OTHER PUBLICATIONS

Sep. 17, 2021—(KR)—International Search Report Appn PCT/KR2020/019456.

* cited by examiner

*Primary Examiner* — Vanel Frenel
(74) *Attorney, Agent, or Firm* — Banner & Witcoff, Ltd.

(57) ABSTRACT

The present disclosure relates to a method of receiving information related to a plurality of items, mapping the received information related to items to each of a plurality of cells, comparing at least some of the information related to the items mapped to each of the cells with a threshold value, and providing information related to the cells based on the comparison result, and an electronic apparatus.

14 Claims, 11 Drawing Sheets

Cell Status

Total Cell : 2,376  
Working Cell : 183

8%

After ExSD  
Total number of cells whose ExSD has already passed — 0

ExSD within 30min  
Total number of cells whose ExSD is within 30 minutes — 0

ExSD within 60min  
Total number cells whose ExSD is within 30 minutes to 1 hour — 0

Dead Cell  
Cells with no scan history for 1 hour or more — 0 ~ 310

FIG. 4

| Floor | Wall Status | | | Cell Status | | | ExSD Warn | | | |
|---|---|---|---|---|---|---|---|---|---|---|
| | Total Wall | Working Wall | Available Wall | Total Cell | Working Cell | After ExSD | Within 30min | Within 60min | Dead Cell | |
| 1F | 12 | 2 | 10 | 276 | 0 | 0 | 0 | 0 | 0 | |
| 2F | 22 | 14 | 8 | 528 | 43 | 0 | 0 | 0 | 0 | |
| 3.5F | 10 | 8 | 2 | 240 | 15 | 0 | 0 | 0 | 0 | |
| 3F | 19 | 6 | 13 | 456 | 21 | 0 | 0 | 0 | 0 | |
| 4F | 29 | 21 | 8 | 696 | 104 | 0 | 0 | 0 | 0 | |
| CAMP Rebin MISS | 2 | 0 | 2 | 36 | 0 | 0 | 0 | 0 | 0 | |
| CAMP Rebin MISS 2Line | 1 | 0 | 1 | 18 | 0 | 0 | 0 | 0 | 0 | |
| CAMP Rebin MISS 4Line | 1 | 0 | 1 | 18 | 0 | 0 | 0 | 0 | 0 | |
| Lune | 3 | 0 | 3 | 72 | 0 | 0 | 0 | 0 | 0 | |
| Unknown | 2 | 0 | 2 | 36 | 0 | 0 | 0 | 0 | 0 | |

FIG. 5

2FSamgBin_Camp_12_2F

| Batch | ExSD | Idle Time | A02 | A03 | A04 | A05 | A06 | A07 | A08 | A09 | A10 | A11 |
|---|---|---|---|---|---|---|---|---|---|---|---|---|
| 72694643 | 09-25 19:00 | 2min | 14-RCRT0-3-219 | 14-RCRT0-67-863 | 14-RCRT0-26-305 | 14-RCRT0-15-428 | 14-RCRT0-96-753 | 14-RCRT0-67-165 | 14-RCRT0-10-501 | 14-RCRT0-19-472 | 14-RCRT0-79-222 | 14-RCRT0-73-491 |
| 72694649 | 09-25 04:15 | 5min | | | | | | | | | | |

4FSamgBin_Camp_02_4F

| Batch | ExSD | Idle Time | A01 | A02 | A03 | A04 | A05 | A06 | A07 | A08 | A09 | A10 | A11 |
|---|---|---|---|---|---|---|---|---|---|---|---|---|---|
| 72695709 | 09-25 19:00 | 2min | 14-RCRT0-38-373 | 14-RCRT0-77-872 | 14-RCRT0-38-60 | 14-RCRT0-3-306 | 14-RCRT0-73-605 | 14-RCRT0-98-648 | 14-RCRT0-75-480 | 14-RCRT0-84-907 | 14-RCRT0-1-762 | 14-RCRT0-39-80 | 14-RCRT0-75-612 |
| 72695074 | 09-25 04:15 | 2min | | | | | | | | | | | |
| 72690210 | 09-25 04:15 | 2min | | | | | | | | | | | |
| 72690010 | 09-25 20:45 | 2min | | | | | | | | | | | |

Tote identifier : 14-RCRT0-38-373

|  | Identifier | ABC-XXXX |
| --- | --- | --- |
| First item | Type | Clothing |
|  | Size | 20cm * 10cm * 15cm |
|  | Destination | Suwon |
| Second item | Identifier | ABC-XXXX |
|  | Type | Shoe |
|  | Size | 25cm * 5cm * 10cm |
|  | Destination | Suwon |

METHOD FOR PROVIDING INFORMATION RELATED TO ITEM AND ELECTRONIC APPARATUS USING THE SAME

BACKGROUND

Technical Field

The present disclosure relates to an electronic apparatus for providing information related to cells in which items are located in a distribution center, and a method of providing information related to the items.

Description of the Related Art

A system for storing and managing ordered items to be delivered to customers is increasing in importance amid today's economic growth. New products are constantly being developed, and many products are being released on the market in real time for consumer purchase. Although this growth provides consumers with more choice opportunities for the consumers to choose from a variety of products and services, businesses (for example, retail stores, wholesalers, and the like) are having difficulty storing and managing these increasing number of items.

Prior Art: Korean Patent Laid-Open Publication No. 10-2010-0038957

The prior art discloses a method of operating a high-stage loading system to improve productivity of a container terminal by minimizing waiting for work. As described above, there is a need for a method of efficiently performing work after loading items in the field of distribution.

Meanwhile, in a physical location (for example, a fulfillment center) where items are stored, a batch may be used as a unit of picking for efficiency of work. In this case, since items are classified by batch in consideration of the convenience of picking, managing the items on a batch basis may result in lowered efficiency even when processes such as shipping are performed after the picking.

Therefore, there is a need for a method of managing information related to items in consideration of convenience in performing processes after picking items included in a batch.

SUMMARY

Technical Goals

Example embodiments disclosed herein are directed to an electronic apparatus and an operation method thereof. The technical goals to be achieved by the example embodiments of the present disclosure are not limited to the technical problems described above, and other technical goals may be inferred from the following example embodiments.

Technical Solutions

According a first example embodiment, there is provided a method of providing information related to cells in which items are arranged by an electronic apparatus, the method including acquiring first information related to at least one tote; checking second information related to at least some of a plurality of items included in each of the at least one tote, mapping at least some of the information related to the items located in each of the at least one tote and information related to each cell corresponding to each of the at least one tote based on the first information and the second information, comparing at least some of the information related to the items mapped to each cell with a threshold value, and providing information related to a plurality of cells based on the comparison result.

According to a second example embodiment, there is also provided an electronic apparatus for providing information related to cells in which items are arranged, the electronic apparatus including a memory storing at least one instruction and a processor executing the at least one instruction to acquire first information related to at least one tote, check second information related to at least some of a plurality of items included in each of the at least one tote, map at least some of the information related to the items located in each of the at least one tote and information related to each cell corresponding to each of the at least one tote based on the first information and the second information, compare at least some of the information related to the items mapped to each cell with a threshold value, and provide information related to a plurality of cells based on the comparison result.

According to a third example embodiment, there is also provided a computer-readable recording medium including a non-transitory recording medium recorded with a program allowing a computer to execute the above-mentioned method.

Detailed contents of other embodiments are described in the detailed description and are illustrated in the accompanying drawings.

Effects

According to the present disclosure, an electronic apparatus may effectively perform processes such as shipping after picking by providing a user with information (for example, expected shipping date or elapsed time after receiving information related to items) related to items arranged in each cell or information related to a work status of each cell.

Effects of the present disclosure are not limited to the above-mentioned effects, and other effects that are not mentioned will be clearly understood by those skilled in the art from the description of the claims.

DETAILED DESCRIPTION

The terms used in the embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

Figure 1:
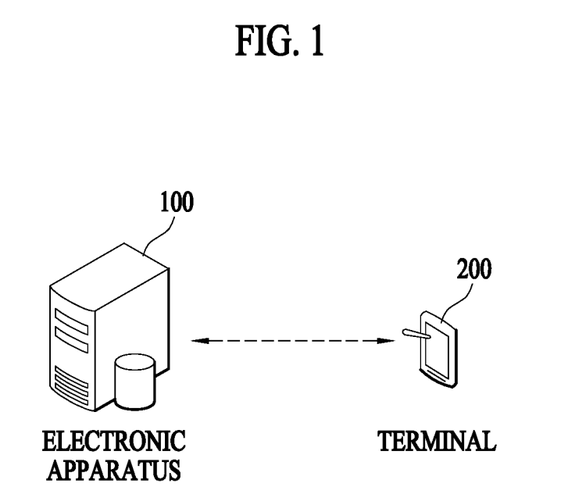
FIG. 1 is a diagram illustrating a system for providing information related to items in a distribution center according to an example embodiment.

FIG. 1 is a diagram illustrating a system for providing information related to items according to an example embodiment.

Referring to FIG. 1, the system for providing information related to items may include an electronic apparatus 100 and a terminal 200. In the system illustrated in FIG. 1, only components related to the present example embodiment are illustrated. Accordingly, it can be understood by those of ordinary skill in the art related to the present example embodiment that other general-purpose components may be further included in addition to the components illustrated in FIG. 1.

The electronic apparatus 100 and the terminal 200 may communicate with each other within a network. The network may include a local area network (LAN), a wide area network (WAN), a value-added network (VAN), a mobile radio communication network, a satellite communication network, or a combination thereof, may be a data communication network in a comprehensive meaning that enables configuration subjects of each network to smoothly communicate with each other, and may include wired Internet, wireless Internet, or a mobile wireless communication network. Examples of wireless communication may include wireless LAN (Wi-Fi), Bluetooth, Bluetooth low energy, Zigbee, Wi-Fi direct (WFD), ultra wideband (UWB), Infrared Data Association (IrDA), near field communication (NFC), and the like, but are not limited thereto.

The electronic apparatus 100 may operate a system for providing information related to items. Specifically, in a distribution center or a fulfillment center that uses a system for providing information related to items, a plurality of items are stored in totes and managed, and each tote may be located in the same cell or in different cells.

In this case, the terminal 200 may recognize at least one of identification information of or related to items, identification information of totes, and identification information of cells, and transmit information related to the recognized identification information to the electronic apparatus 100. Thereafter, the electronic apparatus 100 may check information related to the plurality of items included in the totes, and map information related to cells corresponding to each tote to information related to items included in each tote.

In addition, the electronic apparatus 100 may compare at least some of information related to items mapped to each cell with a threshold value, and provide information related to a plurality of cells to a user based on the comparison result. In addition, the electronic apparatus 100 may transmit the comparison result to the terminal 200.

The electronic apparatus 100 may provide a platform for inventory management or monitoring a status of items stocked in a distribution center. Specifically, the electronic apparatus 100 may provide an application for using information related to the status of items and the inventory management to the terminal 200. Workers and managers in the distribution center may use the terminal 200 to check the information related to the status of items and the inventory management. For example, the electronic apparatus 100 may be included in a server for the inventory management or monitoring the status of items stocked in the distribution center.

Figure 2:
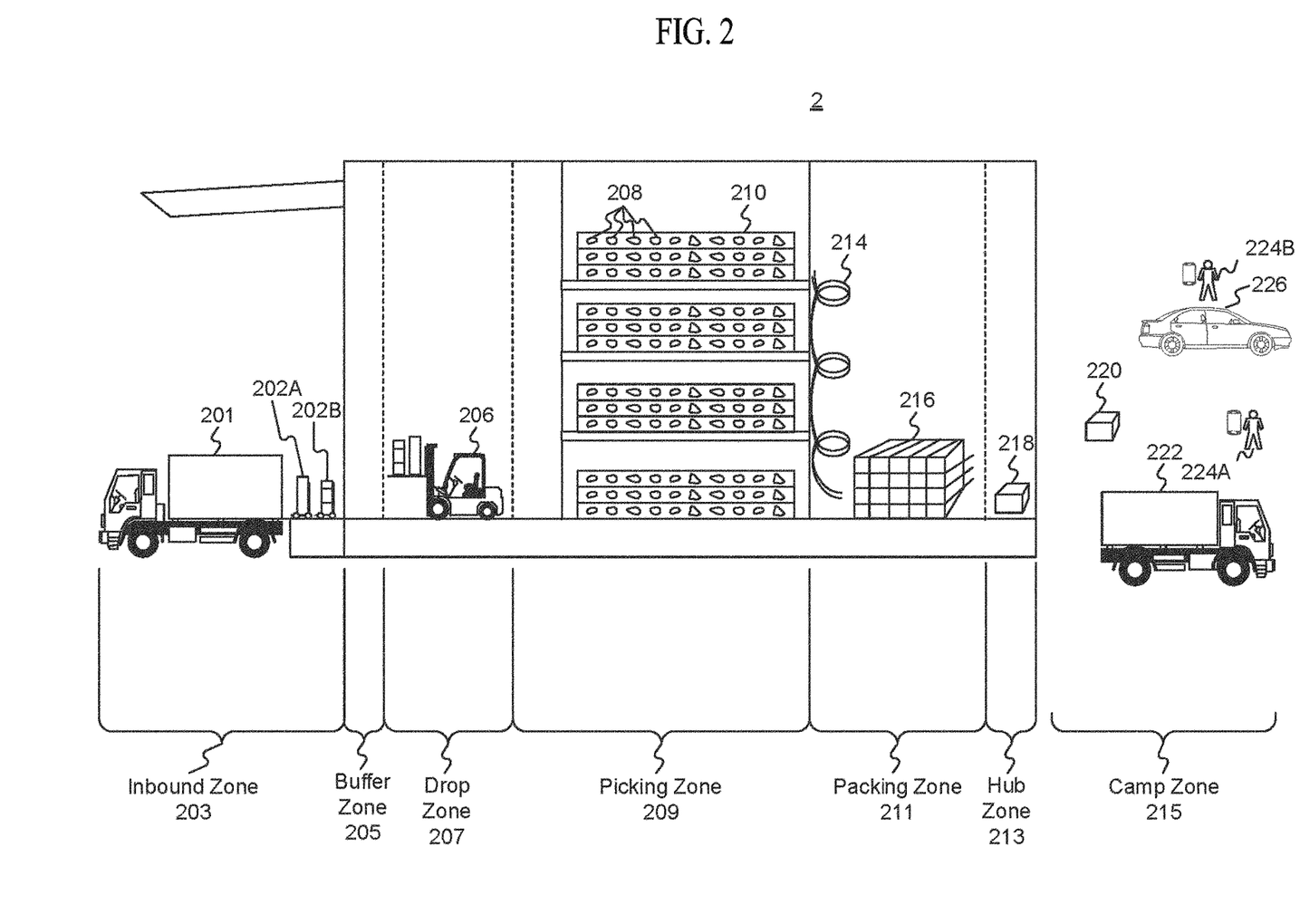
FIG. 2 is a schematic diagram of a fulfillment center which is an example of a physical location where items are stored.

FIG. 2 is a schematic diagram of a fulfillment center (FC) 2 that is an example of a storage space for items.

The fulfillment center 2 is an example of a physical location where ordered items to be delivered to customers are stored, and may be divided into a plurality of areas, which may be represented as illustrated in FIG. 2.

An inbound zone 203 represents an area of the FC 2 in which items are received from sellers. For example, a seller may use truck 201 to deliver items 202A and 202B. The item 202A may represent a single item large enough to occupy its own transport pallet, while the item 202B may represent a set of items loaded together on the same pallet to save space.

A worker may receive items in the inbound zone 203 and check the items for damage and accuracy. For example, the worker may compare the quantity of the items 202A and 202B with the order quantity of the items, and move these items to a buffer zone 205 (for example, using a dolly, a hand truck, or a forklift 206, or manually) if the quantities match. The buffer zone 205 may be, for example, a temporary storage area for items that are not currently required in a picking zone 209 because there is a very sufficient quantity of corresponding items in the picking zone 209 to meet the predicted demand.

A drop zone 207 may be an area of the FC 2 in which items are stored before moving to the picking zone 209. A worker assigned to the picking work may access the items 202A and 202B in the drop zone 207, and recognize identification information (for example, barcodes) related to the picking zone 209 and identification information of the items 202A and 202B using a mobile device (for example, a user terminal). Thereafter, the worker may put the items in a cart or carry the items to move the items to the picking zone 209.

The picking zone 209 may be an area of the FC 2 in which items 208 are stored in a storage unit 210. In particular, according to the present disclosure, a user may pick items in the storage unit 210 within the picking zone 209 according to a picking plan in order to create a display space and place the items in assigned locations. In some embodiments, the storage unit 210 may include one or more of a physical shelf, a wall, a cell, a bookcase, a box, a tote, a refrigerator, a freezer, a cold storage warehouse, and the like. In some embodiments, the picking zone 209 may be formed of a plurality of layers. In addition, in some embodiments, a worker or machine may move items to the picking zone 209 in several ways, including, for example, a forklift, an elevator, a conveyor belt, a cart, a hand truck, a dolly, an automated robot, or a device, or manually.

When a purchaser places an order, a worker may retrieve one or more items 208 from the storage unit 210, recognize identification information of the items 208, and place the items on a transport mechanism 214. Thereafter, the items 208 may arrive at a packing zone 211 via the transport mechanism 214.

The packing zone 211 may be an area of the FC 2 related to a package in which items are received from the picking zone 209 and are packaged in a box 216 or a bag for final transport to a purchaser. A hub zone 213 may be an area of the FC 2 in which all packages 218 are received from the packing zone 211. A worker and/or machine in the hub zone 213 may retrieve the packages 218, determine to which part of a delivery area each package is intended to be delivered, and route the packages to an appropriate camp zone 215. In some embodiments, a worker or machine may recognize identification information of the packages in the camp zone 215 and determine the final destination of the packages. In the exemplary FIG. 2, the camp zone 215 includes a truck 222, a car 226, and delivery workers 224A and 224B.

The present disclosure relates to a series of processes after picking items in units of totes and/or cells mainly performed in the picking zone 209 of the FC 2, but is not limited to the above zone.

Figure 3:
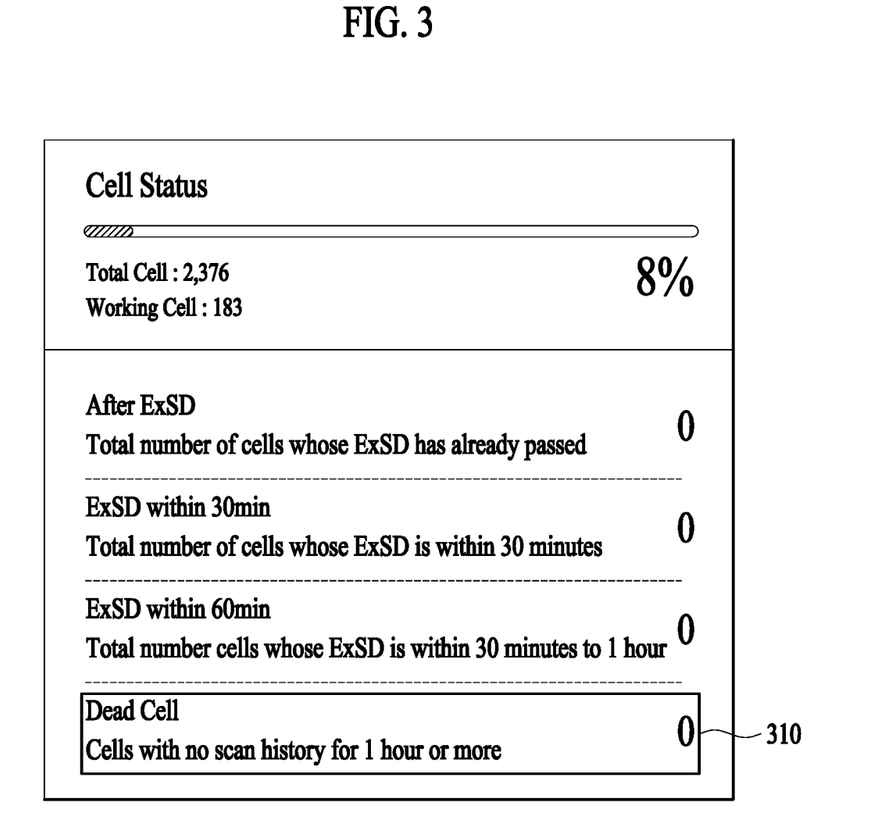
FIG. 3 is a diagram for describing a first example embodiment of providing information related to cells in which items are arranged.

FIG. 3 is a diagram for describing a first example embodiment of providing information related to cells in which items are arranged.

According to an example embodiment, the electronic apparatus 100 may provide information related to a plurality of cells based on information related to items mapped to each cell.

The electronic apparatus 100 according to the example embodiment may identify the total number of cells and the number of currently working cells, and then provide a user with information related to a work status of cells based on the identification result. For example, when one or more items included in a tote are located in a cell, the electronic apparatus 100 may define the corresponding cell as a currently working cell. In this case, upon receiving a signal indicating that items are arranged in a tote, the electronic apparatus 100 may map the corresponding item and the tote. In addition, the electronic apparatus 100 may respond that a worker scans identification information of a tote and identification information of a cell while placing the tote in the cell, thereby mapping the corresponding tote and the cell.

In addition, as illustrated in FIG. 3, the electronic apparatus 100 may display the total number of cells and the number of working cells, and schematize a ratio of working cells and provide the schematized ratio of working cells to a user.

In addition, the electronic apparatus 100 may identify items whose expected shipping date (ExSD) is imminent, based on the expected shipping date among information related to items mapped to each cell. For example, the electronic apparatus 100 may identify items whose expected shipping date has already passed, items whose time remaining until the expected shipping date is less than 30 minutes, and items whose time remaining until the expected shipping date is 30 minutes or more and less than 1 hour. Further, the electronic apparatus 100 may identify the number of cells mapped to each item based on the identification result. For example, when there are two items whose time remaining until the expected shipping date is less than 30 minutes, the electronic apparatus 100 may identify the number of cells mapped to the corresponding items and then provide the identification result to a user. When two items whose time remaining until the expected shipping date is less than 30 minutes are mapped to one cell, the electronic apparatus 100 may determine the number of cells mapped to the corresponding items as 1.

In this case, the electronic apparatus 100 may represent information related to cells in different ways of representation. For example, the electronic apparatus 100 may display the information related to the number of cells including the items whose expected shipping date has already passed in red, and display the information related to the number of cells including the items whose time remaining until the expected shipping date is less than 30 minutes in blue.

Meanwhile, FIG. 3 illustrates 30 minutes, 1 hour, and the like as threshold values compared with the time remaining until the expected shipping date, but it is obvious to a person skilled in the art that the threshold values can be changed according to system design requirements without being limited thereto.

In addition, when work on items mapped to cells is not performed above a threshold value, the electronic apparatus 100 may provide information related to the sum of the cells to a user. Referring to FIG. 3, the electronic apparatus 100 may provide the number of cells 310 whose final scan history for items mapped to cells exceeds 1 hour. The user may monitor the work status in the distribution center or the FC 2 through the information related to these cells, and take additional action on cells that have not been working for a long period of time.

Figure 4:
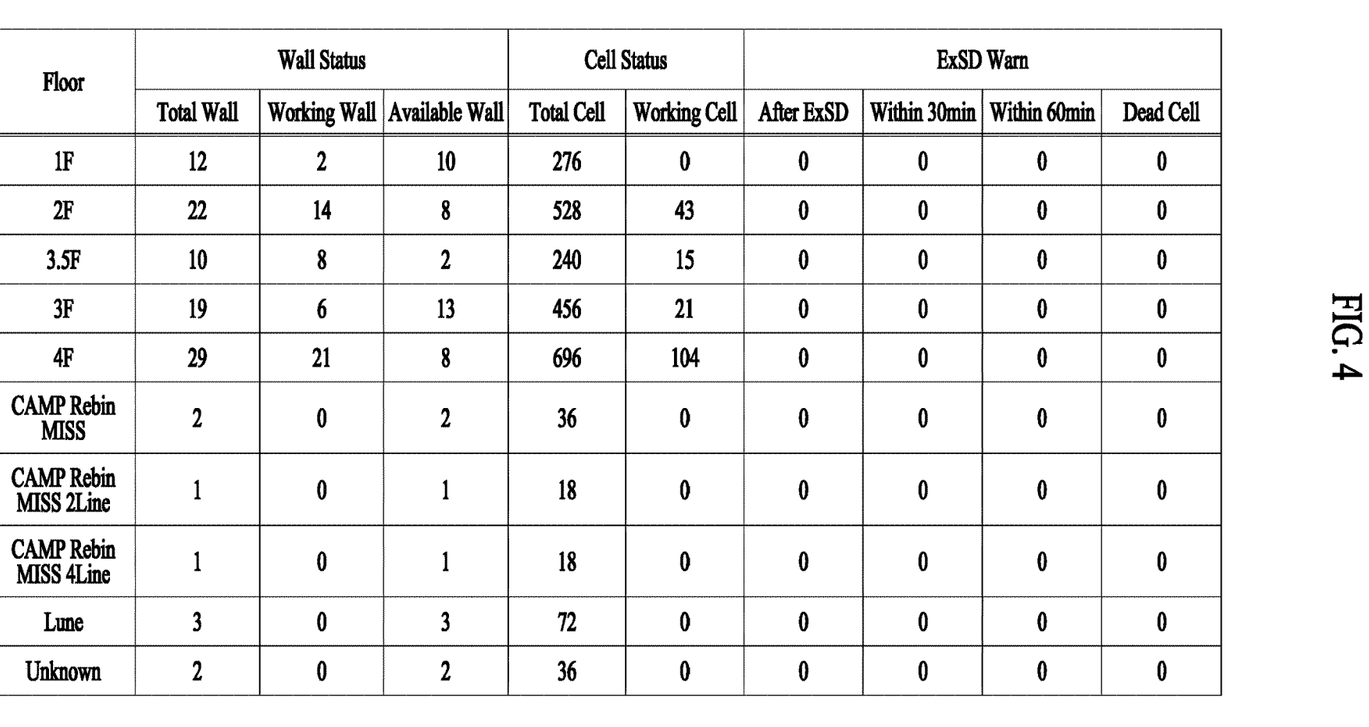
FIG. 4 is a diagram for describing a second example embodiment of providing information related to cells in which items are arranged.

FIG. 4 is a diagram for describing a second example embodiment of providing information related to a cell in which items are arranged.

According to an example embodiment, the electronic apparatus 100 may provide a user with location information of a wall and a work status of the wall. Here, the wall is a unit including a plurality of cells, and may be defined as a unit corresponding to each camp.

For example, the electronic apparatus 100 may classify each wall according to a location, and then display the total sum of walls arranged at each location, the number of working walls, and the number of available walls.

In addition, the electronic apparatus 100 may represent the number of cells included in each wall and the number of working cells, and provide a user with the number of cells including the items whose expected shipping date is imminent, based on the expected shipping date among information related to items mapped to each cell.

Referring to FIG. 4, the total number of walls arranged on a first floor is 12, in which two of the 12 walls are working. In addition, it can be seen that the total number of cells included in the first floor wall is 276. Through the information related to the walls and cells, the user may monitor a work status of each wall in the distribution center.

Figure 5:
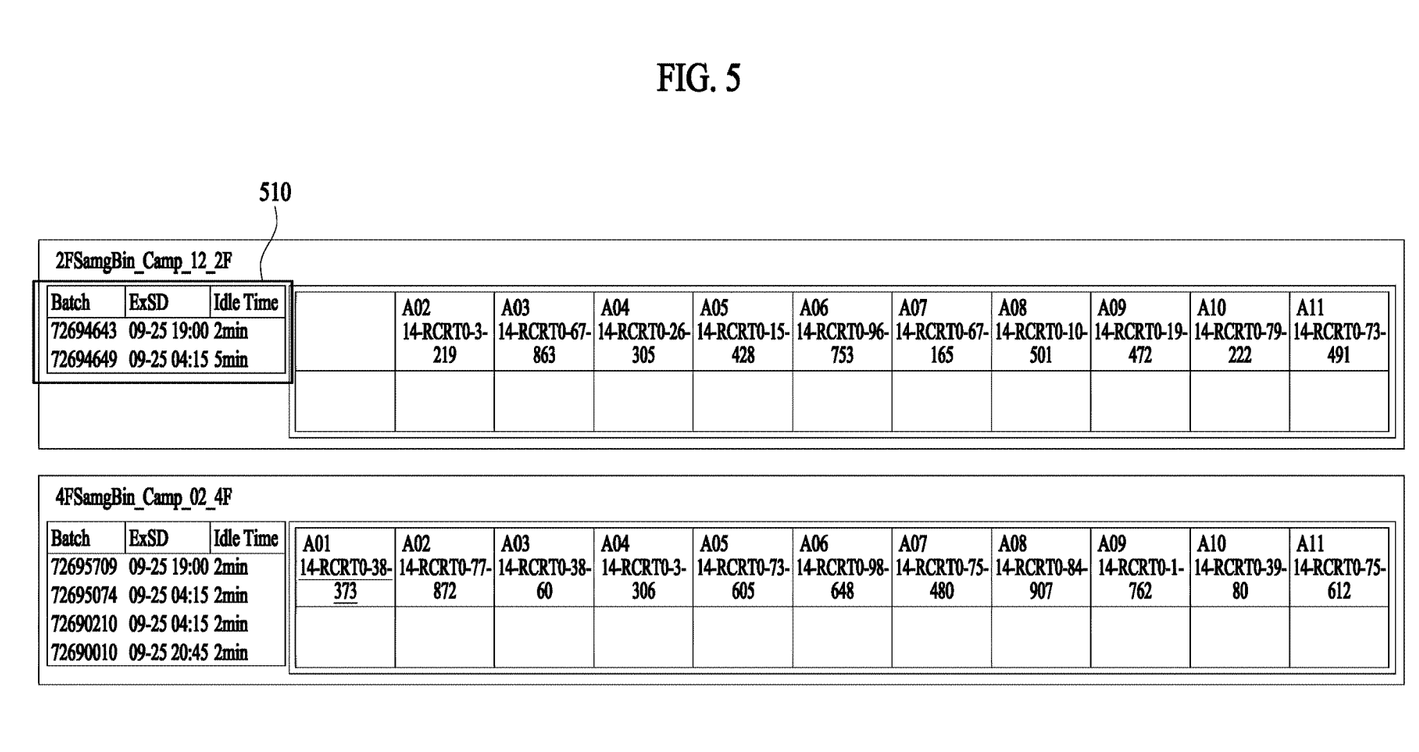
FIG. 5 is a diagram for describing a third example embodiment of providing information related to cells in which items are arranged.

FIG. 5 is a diagram for describing a third example embodiment of providing information related to cells in which items are arranged.

According to an example embodiment, the electronic apparatus 100 may provide identification information of each cell, information related to totes mapped to each cell, and the like.

Referring to FIG. 5, A01 to A09 may be defined as the identification information of cells. In addition, identification information 14-RCRT0-3-219 of a tote corresponding to a second cell A02 is displayed together with the identification information of the second cell A02, and a user input for the identification information 14-RCRT0-3-219 of a tote may be received. Information provided to a user when a user input for identification information (for example, 14-RCRT0-38-373) of a tote is received will be described in detail with reference to FIG. 6.

Meanwhile, the electronic apparatus 100 may map, to each cell, the most imminent expected shipping date among the expected shipping dates of the items mapped to each cell and provide the mapped most imminent expected shipping date to a user.

In addition, the electronic apparatus 100 may order and provide expected shipping dates of a plurality of items mapped to a plurality of cells. Referring to FIG. 5, the electronic apparatus 100 may provide tote identification information of each tote corresponding to the second cell A02 to the eleventh cell A11. As indicated by reference numeral 510 of FIG. 5, among the expected shipping dates of the items mapped to the second cell A02 to the eleventh cell A11, an expected shipping date of two items whose expected shipping date is imminent may be provided together with batch identification information.

Meanwhile, the electronic apparatus 100 may provide batch information related to each cell, and the batch may be defined as a unit for picking items. In other words, a plurality of items may be picked in units of batches. In this case, since items are classified by batch in consideration of the convenience of picking, the convenience of work is likely to decrease when processes such as shipping after picking are performed in units of batches. Accordingly, in the distribution center or the FC 2 using the present disclosure, work on items may be performed in units of totes.

In addition, the electronic apparatus 100 may provide the user with an idle time after at least one of the information related to totes corresponding to each cell and the information related to items included in the totes is received, so that the user may identify cells that have not been working for a long period of time.

Figure 6:
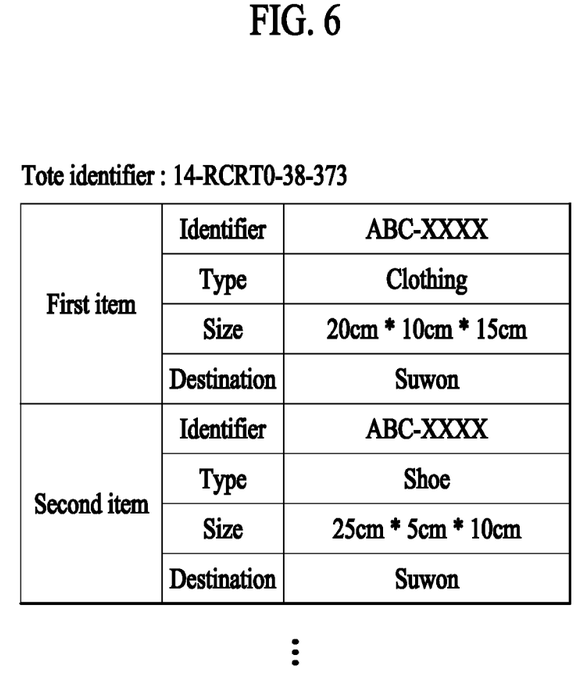
FIG. 6 is a diagram for describing a fourth example embodiment of providing information related to items included in a tote.

FIG. 6 is a diagram for describing a fourth example embodiment of providing information related to items included in a tote.

The electronic apparatus 100 according to an example embodiment may provide information related to items included in the corresponding tote based on a user input for identification information of the tote.

For example, when a user input for identification information 14-RCRT0-38-373 of a first tote corresponding to a first cell A01 of FIG. 5 is received, the electronic apparatus 100 may provide the information illustrated in FIG. 6. Specifically, the electronic apparatus 100 may provide identification information, information related to a type, a size, a destination, and the like of an item, but the information related to the item provided by the electronic apparatus 100 is not limited thereto.

Figure 7:
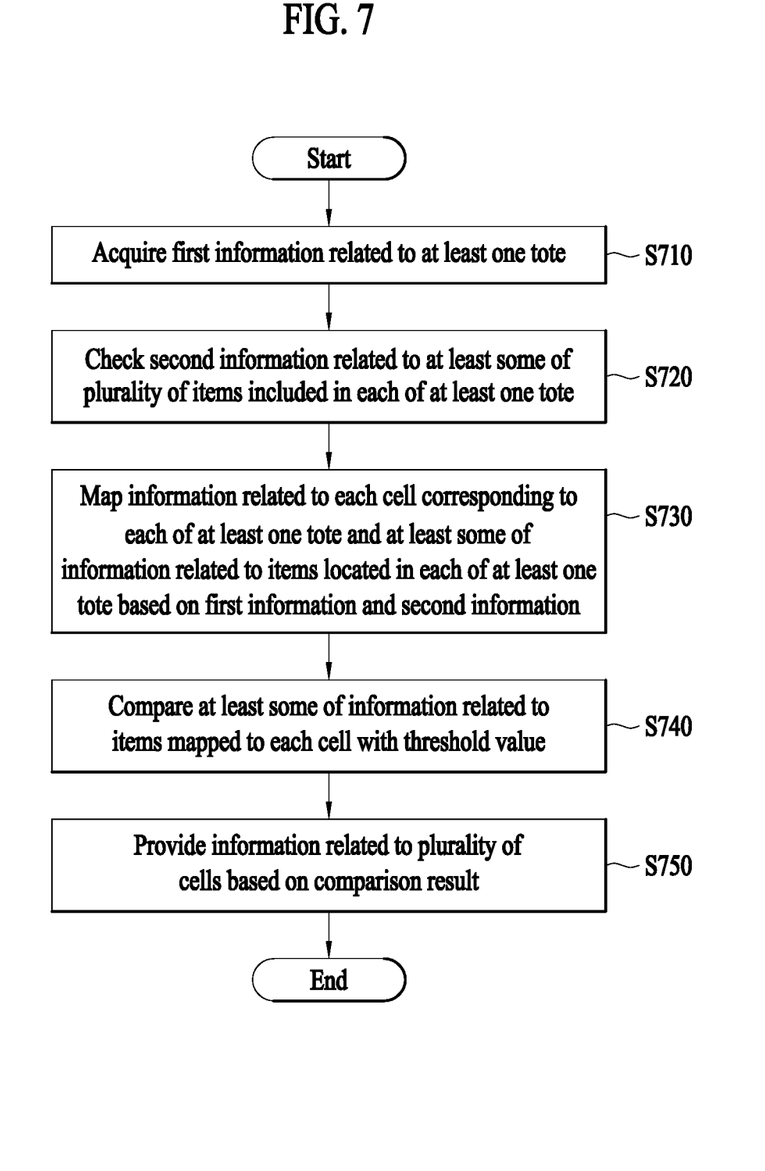
FIG. 7 is a flowchart for describing a method of providing information related to cells, in which items are arranged, by an electronic apparatus according to an example embodiment.

FIG. 7 is a flowchart for describing a method of providing information related to cells in which items are arranged, by an electronic apparatus according to an example embodiment.

In operation S710, an electronic apparatus 100 may acquire first information related to at least one tote. Here, the first information may include identification information of the tote, but is not limited thereto.

In operation S720, second information related to at least some of the plurality of items included in each of the at least one tote may be checked. Here, the second information may include the identification information of the item, but is not limited thereto.

In operation S730, the electronic apparatus 100 may map at least some of the information related to the items located in each of the at least one tote and information related to each cell corresponding to each of the at least one tote based on the first information and the second information.

In operation S740, the electronic apparatus 100 may compare at least some of the information related to the items mapped to each cell with a threshold value.

In operation S750, the electronic apparatus 100 may provide information related to a plurality of cells based on the comparison result.

Meanwhile, operation S740 may include an operation of comparing the time remaining until the expected shipping date of the items mapped to each cell with the first threshold value. In this case, operation S750 may include an operation of providing the number of cells mapped to items whose time remaining until the expected shipping date is less than the first threshold value.

Here, operation S740 may further include an operation of comparing the time remaining until the expected shipping date of the items mapped to each cell with a second threshold value. In this case, operation S750 may further include an operation of providing the number of cells mapped to items whose time remaining until the expected shipping date exceeds the first threshold value and is less than the second threshold value and the number of cells mapped to items whose time remaining until the expected shipping date is less than the first threshold value in different ways of representation.

In this case, the different ways of representation may include at least one of text of different colors, different alarm sounds, presence or absence of flickering, and backgrounds of different colors, but are not limited thereto.

Meanwhile, when cells mapped to different items whose time remaining until the expected shipping date is less than the first threshold value are the same, the number of cells provided may increase by 1.

Meanwhile, operation S750 may further include an operation of providing information related to the most imminent expected shipping date among the expected shipping dates of the items mapped to each cell.

In addition, the method of the present disclosure may further include an operation of providing the identification information of the totes corresponding to each cell, and an operation of providing at least some of the information related to the items included in the totes based on the user input corresponding to the identification information of the totes.

In this case, at least some of the information related to the item included in the tote may be at least one of identification information, information related to type, size, and destination of the item.

In addition, the method of the present disclosure may further include an operation of receiving information indicating that the work on the first tote corresponding to the first cell has been completed, and an operation of updating the tote corresponding to the first cell to a second tote instead of the first tote.

Meanwhile, operation S750 may further include an operation of providing information related to an elapsed time from at least one of the time when the first information is acquired and the time when the second information is checked. In this case, the method may further include an operation of transmitting at least one of the identification information of the first tote, the identification information of the cell mapped to the first tote, and the location information of the cell mapped to the first tote to a terminal when a time elapses beyond a third threshold value after the time when the information related to the first tote is received.

Meanwhile, operation S750 may include an operation of providing the information related to the plurality of cells according to the status information of each cell determined based on a processing result of work on the items mapped to each cell. In this case, the information related to the plurality of cells may include at least one of the number of working cells, the total number of cells, location information of the total cells, and an average value of the time required for the work of the plurality of cells.

In addition, the method of the present disclosure may further include an operation of providing information related to a wall including a plurality of cells. In this case, the information related to the wall may include at least one of the total number of walls, locations of the total walls, the number of working walls, and the number of currently available walls.

Figure 8:
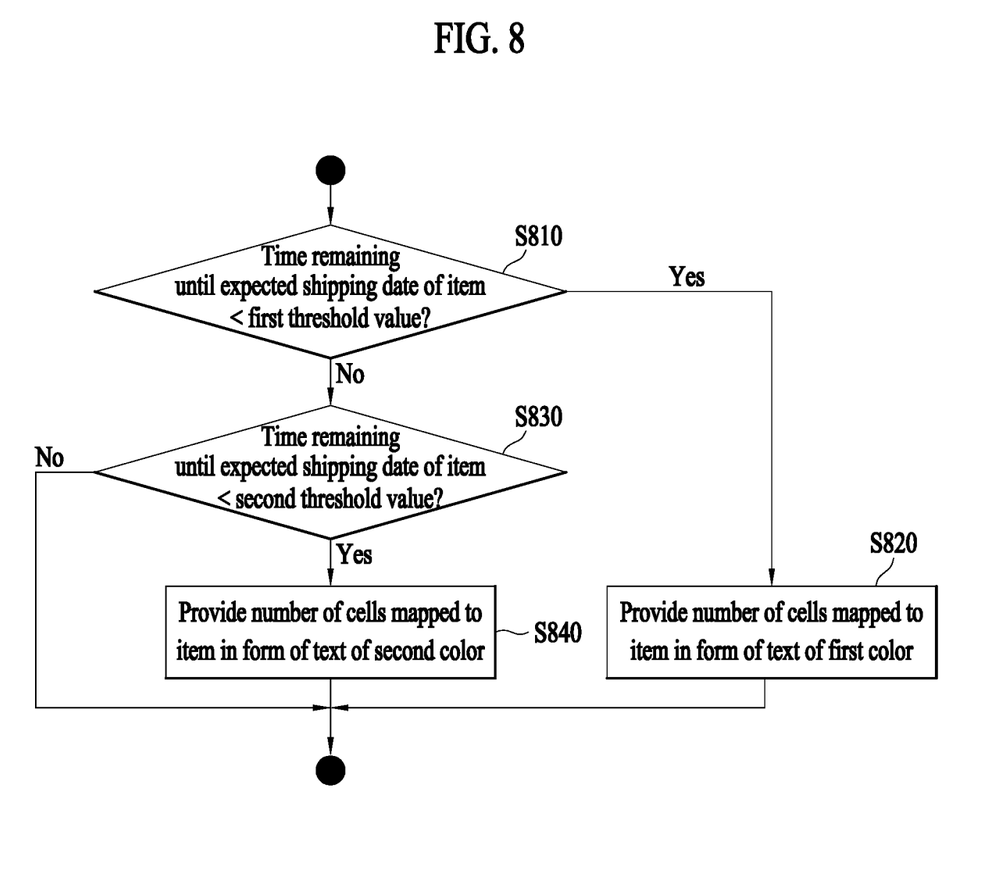
FIG. 8 is a flowchart for describing a method of providing information related to cells, in which items are arranged, by an electronic apparatus according to another example embodiment.

FIG. 8 is a flowchart for describing a method of providing information related to cells in which items are arranged, by an electronic apparatus according to another example embodiment.

In operation S810, an electronic apparatus 100 may determine whether the time remaining until the expected shipping date of the item is less than the first threshold value. If the time remaining until the expected shipping date of the item is less than the first threshold value, operation S820 may be performed, and otherwise, operation S830 may be performed. For example, the first threshold value may be 30 minutes, but is not limited thereto.

In operation S820, the electronic apparatus 100 may provide the number of cells mapped to the items in the form of text of a first color. For example, the electronic apparatus 100 may provide a user with the number of cells mapped to items whose time remaining until the expected shipping date is less than the first threshold value, that is, items whose expected shipping date is closer than the first threshold value, in the form of red text. Here, it is assumed that the first color is red, but the first color is not limited thereto.

In operation S830, the electronic apparatus 100 may determine whether the time remaining until the expected shipping date of the item is less than the second threshold value. If the time remaining until the expected shipping date of the item is less than the second threshold value, operation S840 may be performed. Here, the second threshold value is a value greater than the first threshold value. For example, the second threshold value may be 1 hour, but the value of the second threshold value is not limited thereto.

In operation S840, the electronic apparatus 100 may provide the number of cells mapped to the items in the form of text of a second color. For example, the electronic apparatus 100 may provide a user with the number of cells mapped to items whose time remaining until the expected shipping date exceeds the first threshold value and is less than the second threshold value, that is, items whose expected shipping date exceeds the first threshold value but is closer than the second threshold value, in the form of blue text. Here, it is assumed that the second color is blue, but the second color is not limited thereto.

Figure 9:
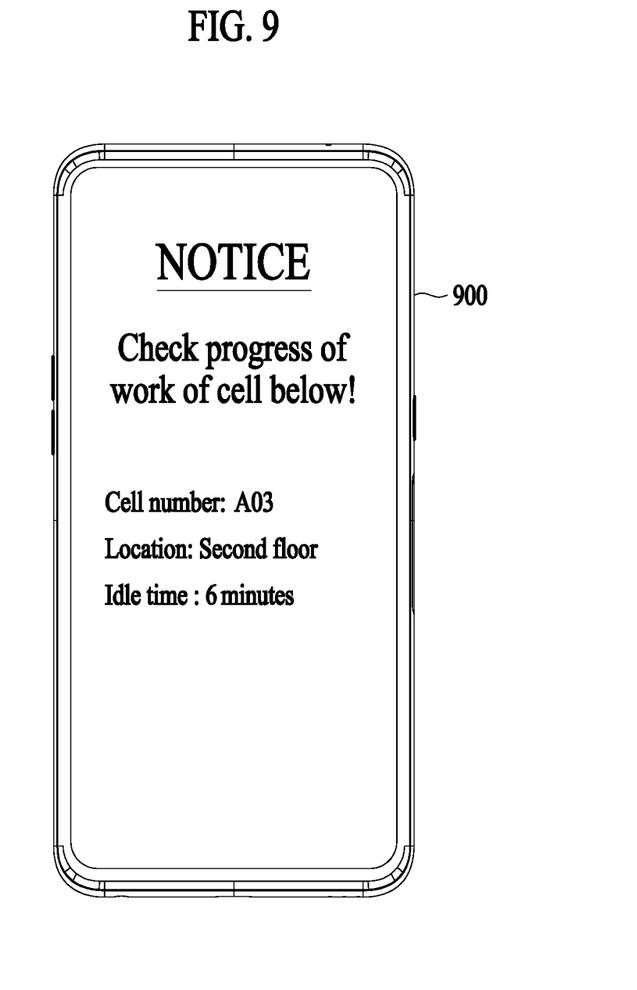
FIG. 9 is a diagram for describing an example embodiment in which a terminal provides information related to items.

FIG. 9 is a diagram for describing an example embodiment in which a terminal provides information related to items.

According to an example embodiment, the electronic apparatus 100 may receive information related to the progress of work on the tote once recognized, and then provide information related to a cell corresponding to the corresponding tote to a manager terminal 900 when the work on the corresponding tote is not performed for a certain period of time.

Referring to FIG. 9, the electronic apparatus 100 may receive information related to items in units of totes included in cell A03, and then provide to the manager terminal 900 that the information related to the progress of work has not been received for 6 minutes. In this case, the electronic apparatus 100 may provide the location information of the cell to the terminal together, and in addition, it is obvious to a person skilled in the art that the electronic apparatus 100 may further provide the manager terminal 900 with information necessary for a manager to understand the work status of the cell or take additional actions.

Figure 10:
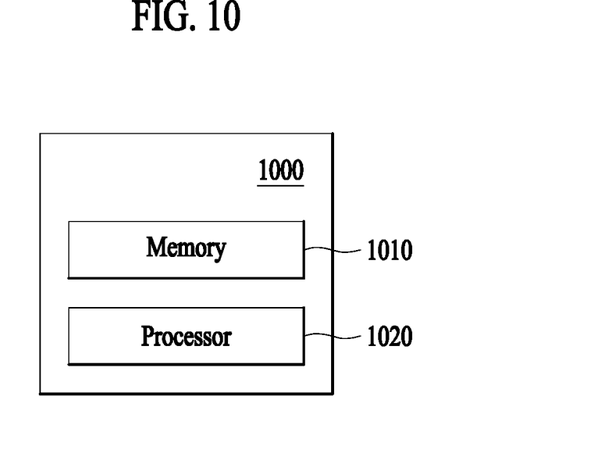
FIG. 10 is a block diagram of an electronic apparatus according to an example embodiment.

FIG. 10 is a block diagram of an electronic apparatus according to an example embodiment.

An electronic apparatus 1000 may include a memory 1010 and a processor 1020 according to an example embodiment. In the electronic apparatus 1000 of FIG. 10, only components related to the present example embodiment are illustrated. Accordingly, it can be understood by those of ordinary skill in the art related to the present example embodiment that other general-purpose components may be further included in addition to the components illustrated in FIG. 10. The electronic apparatus 1000 may include contents related to the electronic apparatus 100, and therefore description of overlapping contents will be omitted.

The memory 1010 is hardware that stores various types of data processed in the electronic apparatus 1000. For example, the memory 1010 may store data that has been processed and will be process in the electronic apparatus 1000. The memory 1010 may store at least one instruction for an operation of the processor 1020. In addition, the memory 1010 may store programs, applications, or the like to be driven by the electronic apparatus 1000. The memory 1010 may include a random access memory (RAM) such as a dynamic random access memory (DRAM) and a static random access memory (SRAM), a read-only memory (ROM), an electrically erasable programmable read-only memory (EEPROM), a CD-ROM, a Blu-ray or other optical disk storage, a hard disk drive (HDD), a solid state drive (SSD), or a flash memory.

The processor 1020 may control the overall operation of the electronic apparatus 1000 and process data and signals. The processor 1020 may control the electronic apparatus 1000 on the whole by executing at least one instruction or at least one program stored in the memory 1010. The processor 1020 may be implemented by a central processing unit (CPU), a graphics processing unit (GPU), an application processor (AP), or the like, but is not limited thereto.

The processor 1020 may receive information related to a plurality of items in units of totes, map the received information related to items to each cell in the units of totes, compare at least some of the information related to the items mapped to each cell with a threshold value, and provide the information related to the plurality of cells based on the comparison result.

In addition, the processor 1020 may compare the time remaining until an expected shipping date of the items mapped to each cell with a first threshold value. In this case, the processor 1020 may provide the number of cells mapped to items whose time remaining until the expected shipping date is less than the first threshold value.

Meanwhile, when cells mapped to different items whose time remaining until the expected shipping date is less than the first threshold value are the same, the number of cells provided by the processor 1020 may increase by 1.

Here, the processor 1020 may further compare the time remaining until the expected shipping date of the items mapped to each cell with a second threshold value. In this case, the processor 1020 may provide the number of cells mapped to items whose time remaining until the expected shipping date exceeds the first threshold value and is less than the second threshold value and the number of cells mapped to items whose time remaining until the expected shipping date is less than the first threshold value in different ways of representation.

In this case, the different ways of representation may include at least one of text of different colors, different alarm sounds, presence or absence of flickering, and backgrounds of different colors, but are not limited thereto.

Meanwhile, the processor 1020 may provide the information related to the most imminent expected shipping date among the expected shipping dates of the items mapped to each cell.

In addition, the processor 1020 may provide identification information of the totes corresponding to each cell, and provide at least some of the information related to the items included in the totes based on a user input corresponding to the identification information of the totes.

In this case, at least some of the information related to the item included in the tote may be at least one of identification information, information related to type, size, and destination of the item.

Meanwhile, the processor 1020 may receive the information indicating that the work on a first tote corresponding to a first cell has been completed, and update the tote corresponding to the first cell to a second tote instead of the first tote.

Meanwhile, the processor 1020 may provide information on an elapsed time from at least one of the time when the first information is acquired and the time when the second information is checked. In this case, the processor 1020 may transmit at least one of the identification information of the first tote, the identification information of the cell mapped to the first tote, and the location information of the cell mapped to the first tote to a terminal when a time elapses beyond a third threshold value after the time when the information related to the first tote is received.

In addition, the processor 1020 may provide the information related to a plurality of cells according to the status information of each cell determined based on a processing result of work on the items mapped to each cell. In this case, the information related to the plurality of cells may include at least one of the number of working cells, the total number of cells, location information of the total cells, and an average value of the time required for the work of the plurality of cells.

In addition, the processor 1020 may provide information related to a wall including a plurality of cells. In this case, the information related to the wall may include at least one of the total number of walls, locations of the total walls, the number of working walls, and the number of currently available walls.

Figure 11:
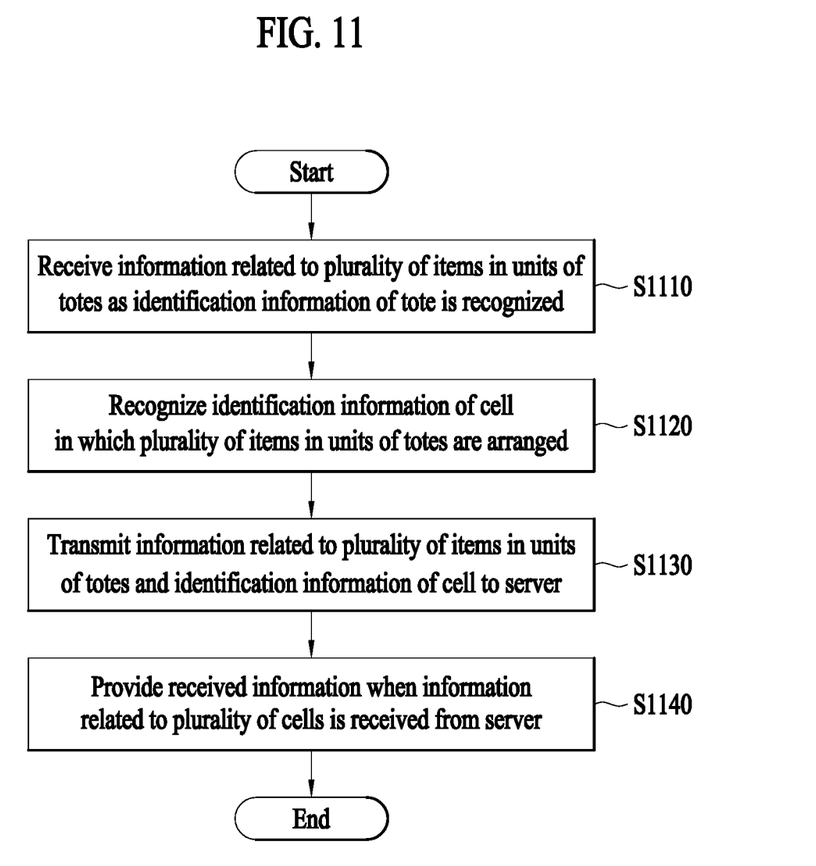
FIG. 11 is a flowchart for describing a method of operating a terminal.

FIG. 11 is a flowchart for describing a method of operating a terminal.

In operation S1110, as the terminal 200 recognizes the identification information of the tote, the terminal 200 may receive information related to a plurality of items in units of totes. For example, since the terminal 200 may include an image sensor, the identification information of the tote may be acquired through the image sensor of the terminal 200. In addition, since the terminal 200 may include a controller, the controller of the terminal 200 may control the image sensor to acquire the identification information of the tote. In addition, the terminal 200 may acquire information related to items included in the tote, based on the identification information of the tote.

In operation S1120, the terminal 200 may recognize identification information of a cell in which a plurality of items in units of totes are arranged. In this case, the controller of the terminal 200 may control the image sensor to acquire the identification information of the cell.

In operation S1130, the terminal 200 may transmit the information related to the plurality of items in units of totes and the identification information of the cell to a server. Since the terminal 200 may include a communication device, the terminal 200 may transmit the information related to the cell and the information related to the plurality of items in units of totes to an external electronic apparatus through the communication device.

In operation S1140, when the information related to the plurality of cells is received from the server, the terminal 200 may provide the received information. According to an example embodiment, since the terminal 200 may include a display, the terminal 200 may display the information related to the plurality of cells through the display. In addition, since the terminal 200 may include the controller, the controller of the terminal 200 may control the display or the communication device to provide the information related to the plurality of cells.

The electronic apparatus or terminal according to the above-described embodiments may include a processor, a memory that stores and executes program data, a permanent storage such as a disk drive, a communication port that communicates with an external device, a touch panel, a key, a user interface device such as a button, and the like. Methods implemented as software modules or algorithms may be stored on a computer-readable recording medium as computer-readable codes or program instructions executable on the processor. Here, examples of the computer-readable recording medium may include magnetic storage media (for example, a read-only memory (ROM), a random-access memory (RAM), a floppy disk, a hard disk, etc.), optical reading media (for example, a CD-ROM or a digital versatile disc (DVD)), and the like. The computer-readable recording medium may be distributed in computer systems connected to each other through a network, and as a result, the computer-readable codes may be stored in a distributed scheme and executed. The medium may be readable by a computer, stored in a memory, and executed on a processor.

The present embodiment may be represented by functional block configurations and various processing steps. These functional blocks may be implemented by various numbers of hardware and/or software components that execute specific functions. For example, the embodiment may employ integrated circuit configurations, such as memory, processing, logic, and a look-up table, capable of executing various functions by control of one or more microprocessors or other control devices. Similar to executing the components in software programming or software elements, the present embodiment can be implemented in programming or scripting languages such as C, C++, Java, and assembler, including various algorithms implemented by a combination of data structures, processes, routines or other programming configurations. Functional aspects may be implemented in algorithms executed on one or more processors, In addition, the present embodiment may employ a conventional technology for electronic environment setting, signal processing, and/or data processing, and the like. Terms such as "mechanism," "element," "means," and "configuration" may be used widely, and are not limited to mechanical and physical configurations. The terms may include the meaning of a series of routines of software in connection with a processor or the like.

The above-described embodiments are merely examples, and other embodiments may be implemented within the scope of the following claims.

What is claimed is:

1. A method of providing information related to cells in which items are arranged by an electronic apparatus, the method comprising:
    acquiring first information related to at least one tote;
    checking second information related to at least one item of a plurality of items included in each of the at least one tote;
    mapping at least some of information related to items located in each of the at least one tote to information related to each of a plurality of cells corresponding to each of the at least one tote based on the first information and the second information;
    configuring a first threshold value and a second threshold value for distinguishing a time remaining until an expected shipping time of the items mapped to each cell based on the information related to the items mapped to each of the cells;
    comparing the time remaining until the expected shipping time of the items mapped to each of the cells with the first threshold value and the second threshold value; and
    providing information related to the cells based on the comparing,
    wherein the information related to the cells includes, first cell information including a number of cells mapped to items past the expected shipping time, second cell information including a number of cells mapped to items in which time remaining until the expected shipping time is less than the first threshold value, third cell information including a number of cells mapped to items in which time remaining until the expected shipping time is greater than the first threshold value and is less than the second threshold value, and fourth cell information including a number of cells mapped to items in which time exceeding the second threshold value has elapsed since a last operation was performed, and
    wherein the fourth cell information includes information indicating that time exceeding the second threshold value has elapsed after a last operation was performed on an item mapped to a cell corresponding to the fourth cell information.

2. The method of claim 1, wherein, when a same cell is mapped to different items whose time remaining until the expected shipping time is less than the first threshold value, a count of the cells in the second cell information increases by 1.

3. The method of claim 1, wherein
    the second cell information and the third cell information are provided in different ways of representation.

4. The method of claim 3, wherein the different ways of representation comprise at least one of text of different colors, different alarm sounds, a presence or an absence of flickering, and backgrounds of different colors.

5. The method of claim 1, wherein the providing of the information related to the cells further comprises providing information related to a most imminent expected shipping time among the expected shipping time of the items mapped to each of the cells.

6. The method of claim 1, wherein the providing the information related to the cells comprises providing information related to an elapsed time after at least one of a time when the first information is acquired and a time when the second information is checked.

7. The method of claim 6, further comprising:
    transmitting, to a terminal, at least one of identification information of a first tote, identification information of a cell mapped to the first tote, and location information of the cell mapped to the first tote, when a time elapses beyond a third threshold value after a time when information related to the first tote is received.

8. The method of claim 1, further comprising:
    providing identification information of totes corresponding to each of the cells; and
    providing at least some of the information related to the items included in the totes based on a user input corresponding to the identification information of the totes.

9. The method of claim 1, further comprising:
    receiving information indicating that work on a first tote corresponding to a first cell is completed; and
    updating a tote corresponding to the first cell to a second tote instead of the first tote.

10. The method of claim 1, wherein the providing the information related to the cells comprises providing the information related to the cells according to status information of each of the cells determined based on a processing result of work on items mapped to each of the cells.

11. The method of claim 10, wherein the information related to the cells comprises at least one of a count of working cells, a total number of cells, location information of each of the cells, and an average value of a time required for work of the cells.

12. The method of claim 10, further comprising:
providing information related to a wall including the cells, wherein the information related to the wall comprises at least one of a total number of walls, a location of each of the walls, the number of working walls, and a number of currently available walls.

13. A non-transitory computer-readable recording medium comprising a program allowing a computer to execute the method of claim 1.

14. An electronic apparatus for providing information related to cells in which items are arranged, the electronic apparatus comprising:
a memory comprising at least one instruction; and
a processor,
wherein the processor is configured to execute the at least one instruction to:
acquire first information related to at least one tote;
check second information related to at least one item of a plurality of items included in each of the at least one tote;
map at least some of information related to items located in each of the at least one tote to information related to each of a plurality of cells corresponding to each of the at least one tote based on the first information and the second information;
configure a first threshold value and a second threshold value for distinguishing a time remaining until an expected shipping time of the items mapped to each cell based on the information related to the items mapped to each of the cells;
compare the time remaining until the expected shipping time of the items mapped to each of the cells with the first threshold value and the second threshold value; and
provide information related to the cells based on the comparison,
wherein the information related to the cells includes, first cell information including a number of cells mapped to items past the expected shipping time, second cell information including a number of cells mapped to items in which time remaining until the expected shipping time is less than the first threshold value, third cell information including a number of cells mapped to items in which time remaining until the expected shipping time is greater than the first threshold value and is less than the second threshold value, and fourth cell information including a number of cells mapped to items in which time exceeding the second threshold value has elapsed since a last operation was performed, and
wherein the fourth cell information includes information indicating that time exceeding the second threshold value has elapsed after a last operation was performed on an item mapped to a cell corresponding to the fourth cell information.

\* \* \* \* \*